(12) United States Patent
Tsypliaev et al.

(10) Patent No.: US 8,478,766 B1
(45) Date of Patent: Jul. 2, 2013

(54) UNIFIED DATA ARCHITECTURE FOR BUSINESS PROCESS MANAGEMENT

(75) Inventors: Maxim V. Tsypliaev, Moscow (RU); Peter E. Volynskiy, Moscow (RU)

(73) Assignee: Comindware Ltd., Tortola (VG)

( * ) Notice: Subject to any disclaimer, the term of this patent is extended or adjusted under 35 U.S.C. 154(b) by 311 days.

(21) Appl. No.: 13/019,319

(22) Filed: Feb. 2, 2011

(51) Int. Cl.
*G06F 17/00* (2006.01)
*G06F 17/30* (2006.01)
*G06Q 10/00* (2012.01)

(52) U.S. Cl.
CPC ............. *G06F 17/30* (2013.01); *G06Q 10/00* (2013.01)
USPC ........... 707/756; 707/602; 707/609; 707/754; 707/777; 707/803; 705/7.11; 705/7.29

(58) Field of Classification Search
CPC ......... G06N 5/043; G06N 5/02; G06N 10/063; G06F 17/3084; G06F 17/30734; G06F 8/20
USPC ....... 706/45–50, 55; 707/755–759, 768–769, 707/790–794, 602, 609, 754, 777, 778, 803; 717/100, 106, 104, 114, 137; 705/27.1, 7.11–7.13, 7.27, 7.29
See application file for complete search history.

(56) References Cited

U.S. PATENT DOCUMENTS

| | | | |
|---|---|---|---|
| 8,065,655 B1 * | 11/2011 | Deo et al. ...................... 717/106 |
| 8,352,403 B2 * | 1/2013 | Lee et al. ....................... 706/47 |
| 2003/0101170 A1 * | 5/2003 | Edelstein et al. ................ 707/3 |
| 2007/0203923 A1 * | 8/2007 | Thomas ......................... 707/100 |
| 2008/0177622 A1 * | 7/2008 | Akkiraju et al. ................ 705/10 |
| 2008/0183850 A1 * | 7/2008 | Basu et al. ..................... 709/223 |

(Continued)

FOREIGN PATENT DOCUMENTS

| | | | |
|---|---|---|---|
| EP | 2043009 | * | 4/2009 |
| WO | WO 01/15042 | * | 3/2001 |
| WO | WO 2009/122130 | * | 10/2009 |
| WO | WO 2010/030168 | * | 3/2010 |

OTHER PUBLICATIONS

Jie Yang et al. "An Augmented Tagging Scheme with Triple Tagging and Collective Filtering", 2007 IEEE/WIC/ACM International Conference on Web Intelligence, pp. 35-38.*

(Continued)

*Primary Examiner* — Srirama Channavajjala
(74) *Attorney, Agent, or Firm* — Bardmesser Law Group

(57) ABSTRACT

A computer-implemented method of processing business data, the method including storing data in SPO (subject-predicate-object) format in multiple databases; using a storage layer to connect to the multiple databases and maintaining a record of which data is stored in which database, the data comprising rules and axioms, the axioms representing user data; the rules and the axioms stored in the SPO format; at least one ontology representing a union of at least some rules and axioms that represent a particular data interpretation; a storage layer that permits working with data stored in different databases simultaneously and permits a user to use data from several storages simultaneously; transforming the user data based on context provided by a business application that works with specific objects and ontologies, the context being defined by a particular ontology; performing operations on the data based on triggers specified by the rules; generating new data in the same context; processing requests from a business layer to transform the data; and presenting the data to the user based on the context.

28 Claims, 12 Drawing Sheets

U.S. PATENT DOCUMENTS

| | | | |
|---|---|---|---|
| 2008/0208774 A1* | 8/2008 | Kim et al. | 706/12 |
| 2009/0012842 A1* | 1/2009 | Srinivasan et al. | 705/10 |
| 2009/0077531 A1* | 3/2009 | Miloslavsky et al. | 717/100 |
| 2009/0193054 A1* | 7/2009 | Karimisetty et al. | 707/103 Y |
| 2010/0036862 A1* | 2/2010 | Das et al. | 707/101 |
| 2010/0049731 A1* | 2/2010 | Kiran Vedula | 707/102 |
| 2010/0063982 A1* | 3/2010 | Lawrence | 707/794 |
| 2010/0070517 A1* | 3/2010 | Ghosh et al. | 707/758 |
| 2010/0228693 A1* | 9/2010 | Dawson et al. | 706/12 |
| 2010/0228782 A1* | 9/2010 | Rao et al. | 707/794 |
| 2011/0225167 A1* | 9/2011 | Bhattacharjee et al. | 707/747 |
| 2011/0246530 A1* | 10/2011 | Malafsky | 707/794 |
| 2012/0290427 A1* | 11/2012 | Reed et al. | 705/26.2 |

OTHER PUBLICATIONS

Dongwoo Won et al. "Ontology-driven Rule Generalization andCategorization for Market Data", IEEE 2007, pp. 917-923.*

* cited by examiner

UNIFIED DATA ARCHITECTURE FOR BUSINESS PROCESS MANAGEMENT

BACKGROUND OF THE INVENTION

1. Field of the Invention

The present invention is related to business process management, and more particularly, to a unified architecture and a common syntactical framework for representing context of business process data, and management and tracking of the business processes.

2. Description of the Related Art

Business process management is an increasingly popular area of research and current software development. To date, there is no unified mechanism for a convenient representation of business processes data and data context. Typically, most software vendors provide one piece of the "puzzle", such as CRM (customer relationship management), invoice tracking, order tracking, Gantt chart software, and so on. Many of the vendors in this area are relatively small companies, and typically the software product grows out of their own initial need to solve a particular problem, and the product is often tied to a particular world view of the vendor.

For a typical business enterprise, it is necessary to buy and integrate several pieces of software—for example, project management software typically does not "talk" to accounting software. Customer relationship management software does not talk to parts ordering software, and so on. Additionally, most such software packages have very limited ability to alter or change the way the data is presented to the user. Frequently, a relational database is used as part of the engine, with the attendant limited ability to manually add fields to the database. However, for most end users, the need to change the "candid" data representations represents a substantial difficulty, and often requires hiring consultants or additional IT staff.

The semantic web, see FIG. 1, comprises the standards and tools of XML, XML Schema, RDF, RDF Schema and OWL that are organized in the Semantic Web Stack. The OWL Web Ontology Language Overview describes the function and relationship of each of these components of the semantic web stack XML provides an elemental syntax for content structure within documents, yet associates no semantics with the meaning of the content contained within.

XML Schema is a language for providing and restricting the structure and content of elements contained within XML documents.

RDF is a simple language for expressing data models, which refer to objects ("resources") and their relationships. An RDF-based model can be represented in XML syntax.

RDF Schema extends RDF and is a vocabulary for describing properties and classes of RDF-based resources, with semantics for generalized-hierarchies of such properties and classes.

OWL (see FIG. 2) illustrates additional vocabulary for describing properties and classes: among others, relations between classes (e.g. disjointness), cardinality (e.g. "exactly one"), equality, richer typing of properties, characteristics of properties (e.g., symmetry), and enumerated classes.

Accordingly, what is needed is a unified architecture that permits a business enterprise to easily represent the context for business analysis in business processes that occur within the enterprise, and to provide an easy interaction mechanism between users representing various aspects of the business, and the data stored within the business model.

SUMMARY OF THE INVENTION

The present invention is intended as a method and system for modeling business processes that substantially obviates one or several of the disadvantages of the related art.

In one aspect of the invention, there is provided a computer-implemented method of processing business data, the method including specifying a plurality of axioms representing facts and relationships between the facts, the axioms written in subject-predicate-object triplet format; specifying a plurality of rules for processing the axioms. Some of the rules are compiled to generate an engine for processing at least some of the axioms. A request to the engine is generated, for presenting data to a user. Additional rules needed to respond to the request are compiled and added to the engine, without re-compiling previously compiled rules. The data is processed and presented to the user.

In another aspect, there is provided a computer-implemented method of processing and presenting business data, including storing data in SPO (subject-predicate-object) format in multiple databases; using a storage layer to connect to the multiple databases and maintaining a record of which data is stored in which database, the data comprising rules and axioms, the axioms representing user data; the rules and the axioms stored in the SPO format; at least one ontology representing a union of at least some rules and axioms that represent a particular data interpretation; a storage layer that permits working with data stored in different databases simultaneously and permits a user to use data from several storages simultaneously; transforming the user data based on context provided by a business application that works with specific objects and ontologies, the context being defined by a particular ontology; performing operations, such as, for example, conjunction and disjunction, on the data based on triggers specified by the rules; generating new data in the same context; and processing requests from a business layer to transform the data; and presenting the data to the user based on the context.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 illustrates the semantic web stack.

FIG. 2. illustrates a portion of the semantic web, that includes the family of descriptive languages, including XML, XML Schema, RDF, RDF Schema, OWL.

DETAILED DESCRIPTION OF THE PREFERRED EMBODIMENTS

Reference will now be made in detail to the preferred embodiments of the present invention, examples of which are illustrated in the accompanying drawings.

The following are two examples of representing RDF graphs—in XML format (which is frequently more convenient for computer-based processing) and in the form of N-triplets, or N3 (which is used in the present approach, and which is more convenient for human understanding).

XML syntax:
<?xml version="1.0"?>
<rdf:RDF
xmlns:rdf="http://www.w3.org/1999/02/22-rdf-syntax-ns#"
xmlns:dc="http://purl.org/dc/elements/1.1/"
xmlns:exterms="http://www.example.org/terms/">
<rdf:Description rdf:about="http://www.example.org/index.html">
<exterms:creation-date>Aug. 16, 1999</exterms:creation-date>
</rdf:Description>
<rdf:Description rdf:about="http://www.example.org/index.html">
<dc:language>en</dc:language>
</rdf: Description>
</rdf:RDF>

N3 syntax would be as follows:
<ex:index.html><dc:creator>exstaff:85740.
<ex:index.html><exterms:creation-date>"Aug. 16, 1999".
<ex:index.html><dc:language>"en".

Thus, the XML syntax is far more verbose than the N3 syntax, but, it is much easier for computers to process.

Figure 1:
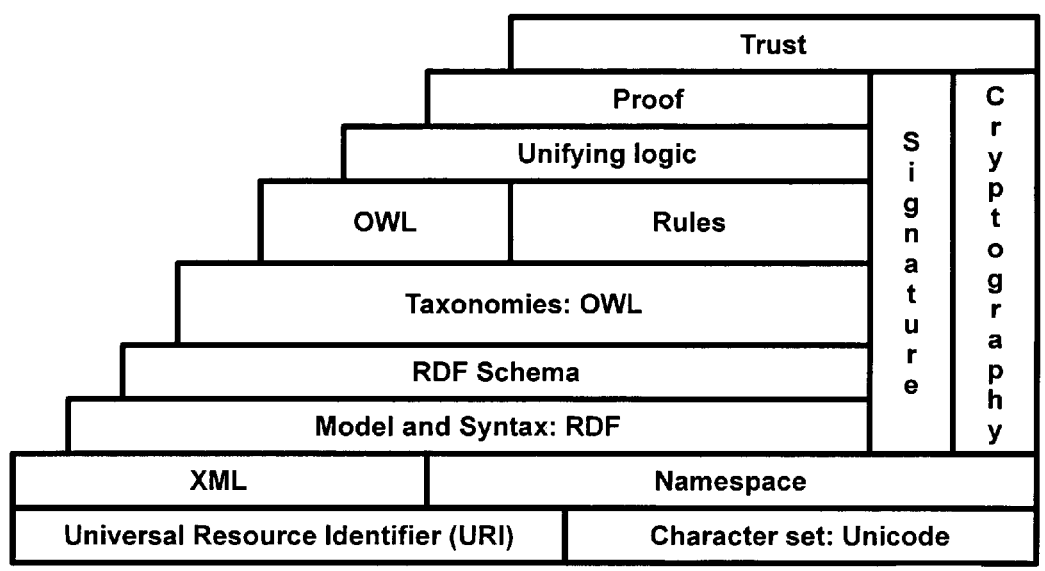
Figure 2:
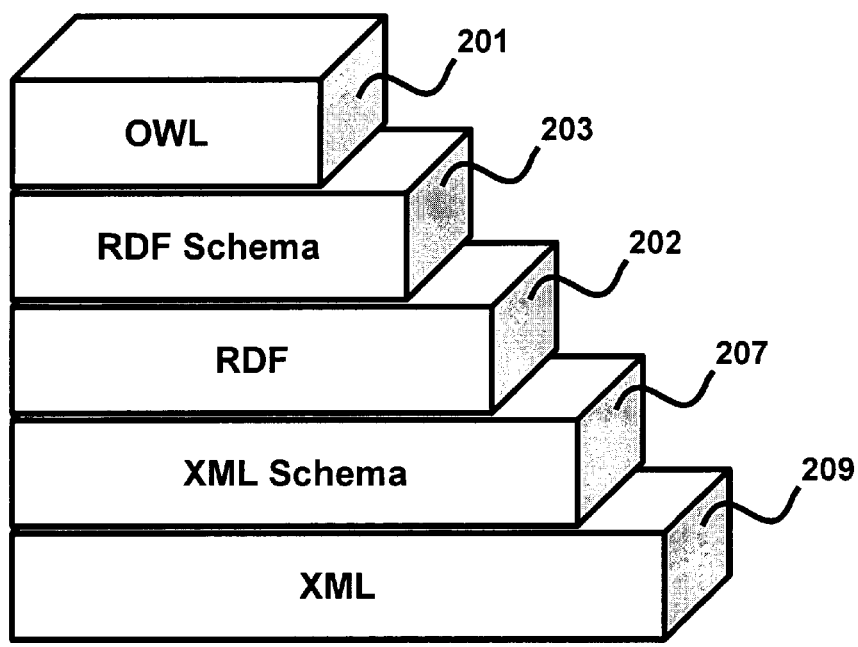
Figure 3:
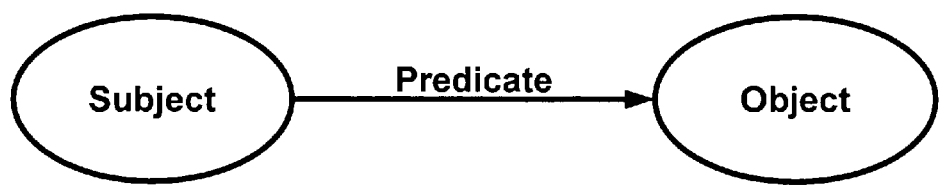
FIG. 3 illustrates an RDF triplet graph.

The basic unit of an RDF is a collection of triplets, each of which consists of a subject, a predicate, and an object (SPO). The set of triplets is commonly referred to as an RDF graph, an example of which is shown in FIG. 3. The direction of the arrow in any given triplet shows in such that the arrow points from the subject to the object (see http:**en.wikipedia.org/wiki/Resource_Description_Framework). The subject of an RDF statement is either a Uniform Resource Identifier (URI) or a blank node, both of which denote resources. Resources indicated by blank nodes are called anonymous resources. They are not directly identifiable from the RDF statement. The predicate is a URI which also indicates a resource, representing a relationship. The object is a URI, blank node or a Unicode string literal.) The triplet approach is one that will be utilized in the present application to process information from various sources.

Figure 4:
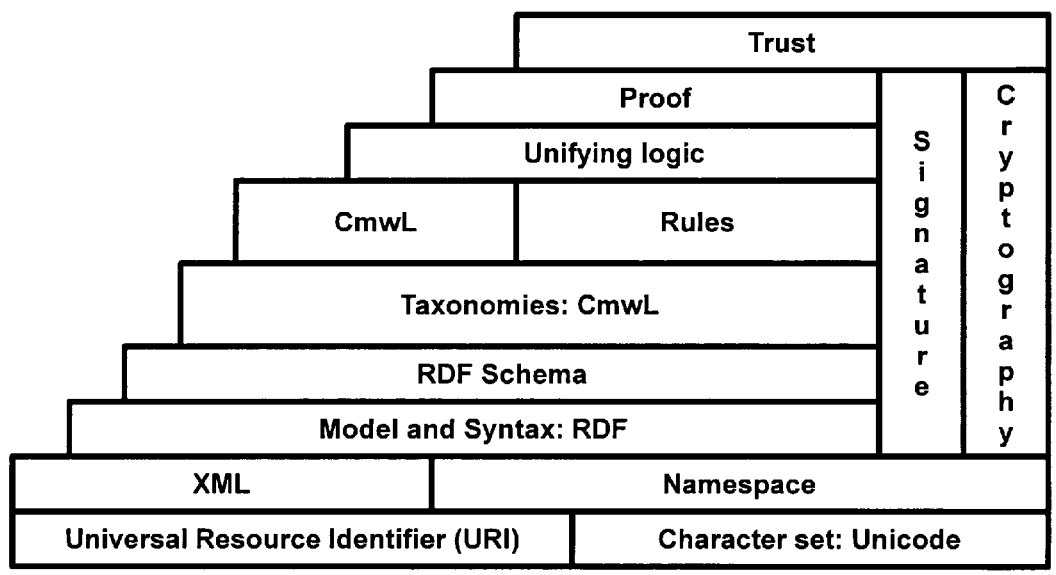
FIG. 4 illustrates the application of semantic web concepts to the data architecture described herein.
Figure 5:
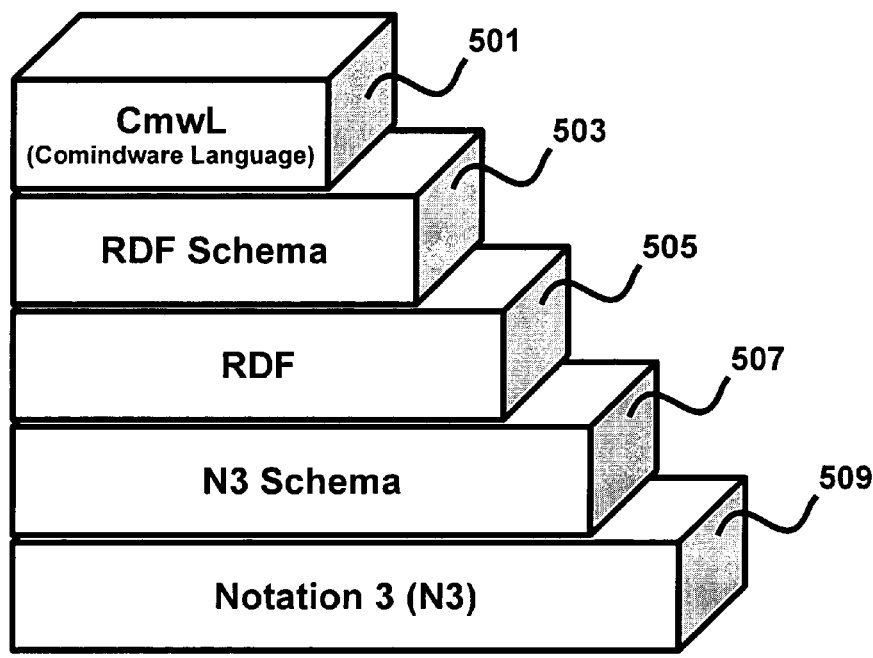
FIG. 5 illustrates a portion of the semantic web, that uses the Comindware language.

FIG. 4 illustrates the application of semantic web concepts to the data architecture described herein, and FIG. 5 illustrates a portion of the semantic web, that uses the Comindware language. As shown in FIG. 4, there is a rough semantic correspondence between the semantic web stack (shown on the left) and the semantic stack of the present application, shown on the right. As shown in FIG. 5, the semantic stack utilized in the present application includes the CmwL (Comindware Language) 501, the RDF schema 503, the RDF 505, the N3 schema 507, and the notation N3 509. The main idea here is that OWL is replaced by a special language—Comindware (after the assignee of this application)—which represents a limited version of OWL, in order to improve performance and get rid of functionality and operations which is unnecessary for the purposes of modeling business processes (but using OWL vocabulary and some of its rules).

The following OWL concepts are used for user templates (see http:**www.w3.org/TR/owl-ref/):
3.1 Class descriptions
3.1.1 Enumeration
3.1.2.2 Cardinality constraints
3.1.3.2 owl:unionOf
3.2.1 rdfs:subClassOf
4.1 RDF Schema constructs
RDF Datatypes
Extended Features:
+User template ontology
+Enumeration type ontology
+Calculated property ontology
+Security ontology
System ontologies to be described in OWL:
+Query ontology,
+Restriction ontology
+Workflow ontology
+User account ontology,
+UI ontologies
+Misc ontologies (e-mail, history, attachment, etc.)

Thanks to the use of the RDF (resource definition framework), it is possible to work with different data sources (databases, data storages, which can be local, on a corporate network, or located on the Internet). It is possible to utilize a common dictionary URI, thereby permitting to integrate data from different servers. It is also possible, based on the data and the rules, to provide on-the-fly representation of the data (rather than static slices, as is done with OLAP cubes).

By way of examples of data sources that can be represented in this matter, a database (or some other type of storage) server that serves the Human Resources department can score data regarding a new employee. The same data can be used by the IT department to add the user to the corporate network. Also, the same data can be used by the accounting department to implement payments of the employees' salary. Note that the servers can be both local (on the corporate network) or remote, for example, accessible over a wide area network, or the internet. Note also that if one of the servers is offline, this will not affect correctness of the data. For example, if the IT department's server is offline at the moment that a new employee is added by the HR department, once the IT server is back online, thanks to RD, the same person will be reflected in both business applications. The email shown in the figure is needed not just to notify the other department that a new employee has been added, but to synchronize the terminology. For instance, to the HR department, a person is an employee, to the IT department he is a a user, to the accounting department, he is a payee. With the help of RDF, the global database can reflect that global:person=HR:employee=IT:user, and then everything will be synchronized with no further efforts by anyone.

Also, the data can be taken from a webpage or, for example, from any source identified by a URI. With the help of "data converters", any information described by RDF can be used, for example, the rules can say "something" from a "source" is source: something—is cmw:"our thing" (see http:**www.w3.org/2000/10/swap/doc/Reach).

Further, by way of example, consider a company that has three business applications—one for HR (human resources management system), one for ACC (accounting system) and one for IT (information technology—Helpdesk). Therefore, each business application can have its own server. When any employee begins work, the human resources "creates" a new employee, specifying the first name, last name, position. Then, either manually or automatically, this information is sent to the accounting department and to the IT department.

The accounting department creates an employee with attributes that are relevant to his employment—salary, type of compensation, such as hourly, monthly, etc., social security number, etc. The IT department creates a user account with the attributes that are relevant to the IT department—such as rights to access internal company resources, the hardware/computer given to the employee, license fees for the software on the employee's computer, etc. These three departments have their corresponding applications, which are shown in FIG. 7, illustrating the HR department and application 701, the accounting department and application 703, and the IT department and application 705. The global can be imagined as Engine, which presents contextualized data to the particular business application, 707, that is why it can aggregate all the information from all the business applications, and generates a contextualized information relating to the employee (as well as to other employees). On the left of FIG. 6 (to the left of the Storage Layer) is the pool of information which can be stored in different databases or other storages. 707 is the element that permits presenting contextualized business information for a particular application. "Global" is an entity for a representation of the data in a particular context of a business application.

Context can be thought of as an environment surrounding a particular event, object or individual that defines the interpretation of data and actions/operations on the data in a particular situation. Optionally, the context defines the method of processing the data in a particular situation. For example, someone's email address can be treated as a login information in one context, and as a contact information in user's profile, in another context, and as a requestor in a support ticket, in a third context—all depending on interpretation of the data.

The exchange of information between the servers is done automatically, since all the servers use a common dictionary. For example: http://<company_name>.com/tracker/ontology/global/hr, or http://<company_name>.com/tracker/ontology/global/it or http://<company_name>.com/tracker/ontology/global/acc, all are conjoined into http://<company_name>.com/tracker/ontology/global).

Even in the case where the accounting department, when creating an employee record manually, uses its own dictionary, it is possible to write a rule {ACC:person is Global:employee}, thereby providing a translation mechanism between the accounting department's dictionary and the global dictionary.

From this example, it is clear that the proposed architecture permits each individual group or department within a business to work with its own database/storage and its own server system, while the global server with engine 707 can present a combined view of all the data from all the departments. This is done on-the-fly, and without duplicating the data, which is particularly important from the perspective of information security, as well as from a point of view of maintaining up to date information (in this case, when the data on one storage changes, there is no need to change the data on other storages) global:person+rule description for "receiving a person" from the local business applications is the ontology for Person in the Global database. Thus, one option is using a different ontology for each business application, while another option is the use of a common ontology for all applications.

Figure 6:
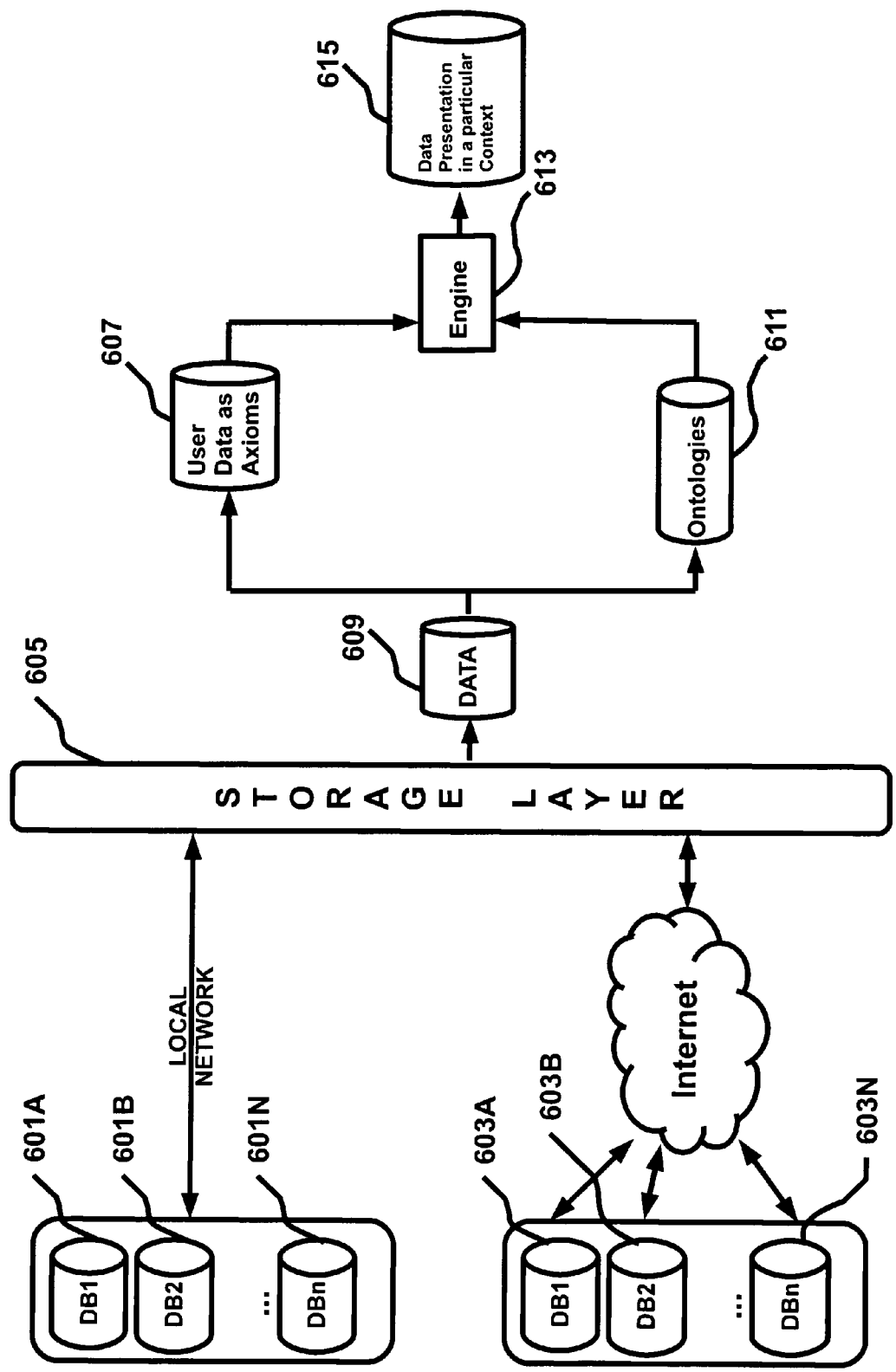
FIG. 6 illustrates an exemplary system architecture.
Figure 7:
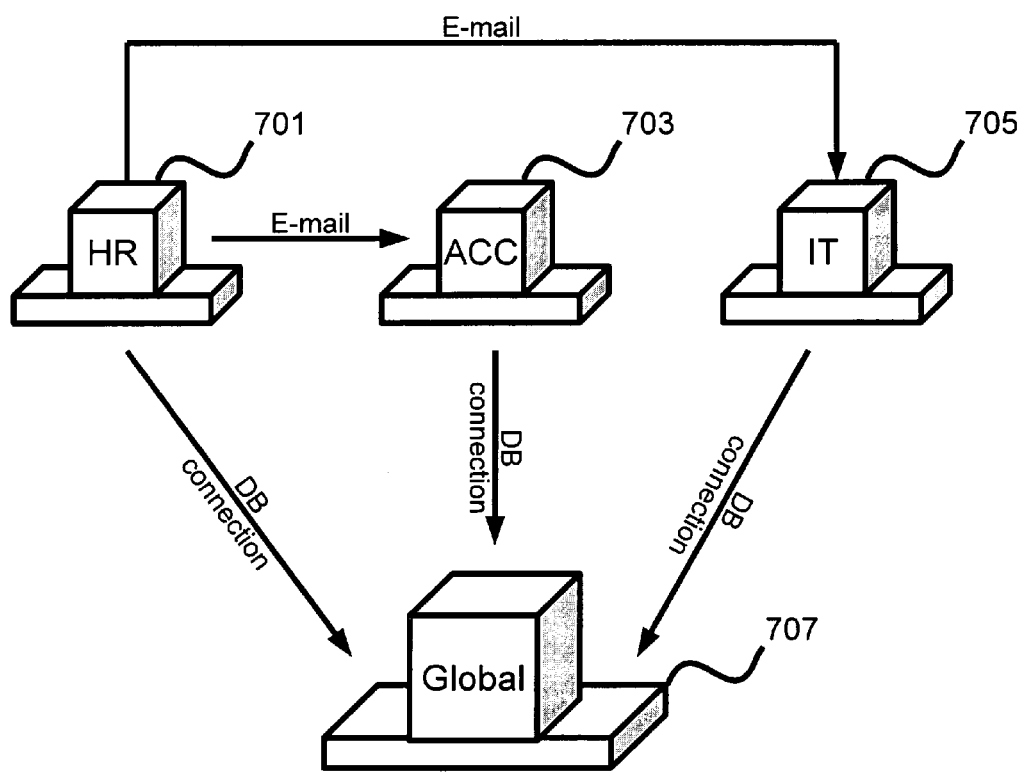
FIG. 7 illustrates an example of different business applications used in different departments of a company, in the exemplary case.

FIG. 6 illustrates an implemented method for accessing any data storage using URI and for presenting data in a certain context. As shown in FIG. 6, an enterprise can have a number of database servers 601A, 601B, . . . 601N. The enterprise can also interface to other database servers, for example, over a wide area network or over the Internet, see database servers 603A, 603B, . . . 603N. A storage layer 605 provides engine with the requested data from the particular storage.

Provided data 609 can be separated into the user data as axioms (facts) 607, and the ontology (presented as axioms as well, but which can be distinguished by N3 syntax). In other words, 611 contains information about what and how should be presented for the particular user in a particular Business Application. 607 and 611 are processed by the Core and the result of processing is 613—the Engine (Engine is a part of Core), which can present data in a particular context (615) according to the ontologies.

The on-the-fly data representation can be illustrated with the following example. Consider the ontology data (i.e., the data that describes the entities which are being manipulated) in the context of business applications, for example, project management, issue tracking, bug tracking, CRM, etc. Each one is stored in its own database (or, alternatively, in a common database), and are combined at a higher level. With the aid of a logical core, it is possible to combine the various available data into different combinations and sets of ontologies, for example: using specific ontologies, a developer can see the context of the representation of the bug submitted by QA as a task, assigned to him, in other words, it is possible to track to which task each particular bug that is being worked on relates.

It is also worth discussing the difference between on-the-fly representations possible with the approach described herein, and such static representations as provided by OLAP cubes (online analytical processing in real time), which is one conventional technique for generating reports and different statistical documents. OLAP cubes are frequently used by analysts to quickly process complex database queries, and is particularly commonly found in marketing reports, sales reports, data mining, and so on. The reason that OLAP cubes are so widespread is the speed with which the processing can be performed. Relational databases store the information about the various entities in separate tables, which are usually well normalized. This structure is convenient for most operational database systems, however, complex multi-table queries are usually difficult to perform rapidly. A good model for such queries (rather than for changes) is a table constructed using facts from the OLAP cube. The cube metadata is typically created from a star schema or snowflake schema of tables in a relational database. http:**en.wikipedia.org/wiki/OLAP#Concept OLAP performs a slice of the relational database at a particular moment in time, and structures it into a spatial model for questions. OLAP structures, generated from the working data, are referred to as OLAP cubes. The cube is generated by combining tables, by using a snowflake schema or a star schema. In the center of the star schema is a table of facts, that contains key facts used to generate the queries. Multiple tables with changes are connected to the table of facts. These tables show how the aggregated relational data can be analyzed. The number of possible aggregations is defined by the number of ways in which the original data can be hierarchically displayed. The OLAP cube contains the basic data and the dimensional information (the aggregates). The cube potentially contains all the information that can be required for answering or responding to the queries. Therefore, to analyze the information, it is necessary to generate slices of the cube (represented by tables). For example, it is possible to look at various two-dimensional slices of the cube, moving the "location" of the slice vertically and horizontally in the cube, as well as opening and closing the levels within the cube.

The difficulty in using OLAP as a methodology is in generating the queries, selection of the basic data and generation of the appropriate schema, which is a reason why most modern OLAP products are typically supplied together with a vary large number of predefined queries.

Another problem is in the basic data of the OLAP cube, which needs to be complete and non-contradictory. Thus, the main problem with OLAP cubes is that the analysis process typically requires recreation of the cube itself, or frequent regeneration of slices. Unlike OLAP cubes, the proposed approach permits on-the-fly regeneration of data representation, without the complexities of predefined and pre-generated queries.

In brief, the process of the approach discussed herein can be described as follows:

the business layer requests data from the core;

the logical core collects the data from different sources;

the logical core recognizes the nature of the data and divides the data into axioms and rules for example, for the bug tracker, an axiom could be "resolution :is "need more info"", and a rule could be {?o operation:hasRequiredData ?f. ?f bfield:empty True.}=>{?o operation:allow False};

the engine required for completing Business layer request compiled Rules is put together (for example, in C# code, although the invention is not limited to any particular language).

The engine can have rules that were collected and compiled previously, as well as new rules, for those rules that have not been processed before. Therefore, the compilation needs only to be performed for new rules. Thus, the core does not need to constantly work with the data, but only addresses the data in response to requests from the business layer;

the engine processes the axioms, and the result new axioms are generated;

the core returns the requested data to the business layer.

Figure 8:
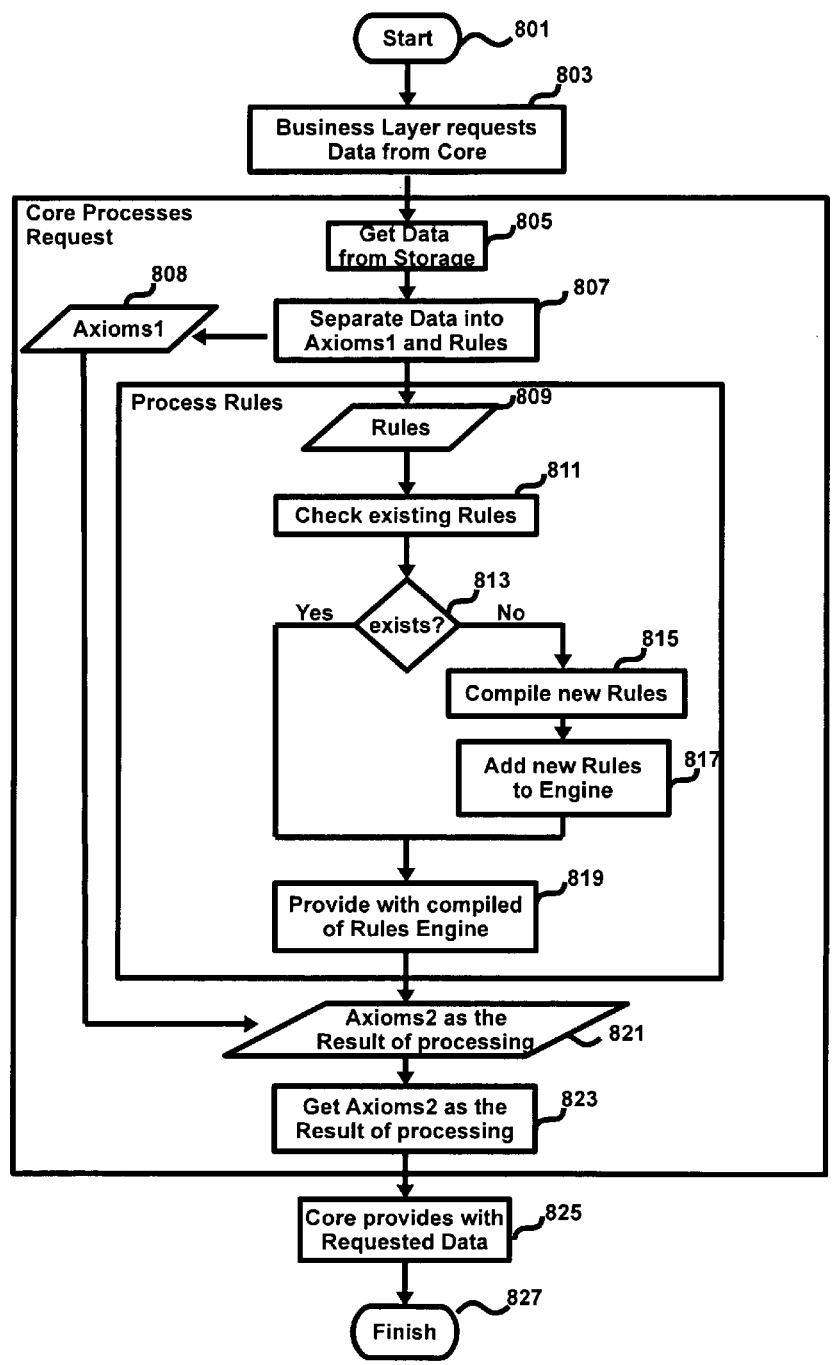
FIG. 8 illustrates a data processing algorithm, according to one embodiment of the invention.

FIG. 8 illustrates the algorithm of processing data, according to one embodiment of the invention. As shown in FIG. 8, after the start step (801), the business layer requests data from the core (step 803). In step 805, the data is received from storage, and the data is separated in to axioms and rules (step 807).

In the next step, user data, which is stored as facts (607 in FIG. 6), are received from storage, and are divided into rules (809) and data-axioms (808). In step 811, the existing rules are checked. If the rule exists, in step 813, the rules and the engine are used (step 819). Otherwise, after step 813, new rules are compiled (step 815). The new rules are then added to the engine (step 817). The system then begins working with the Engine, comprising the new rules (step 819). In step 821, the axioms are processed by the engine. As a result of Engine processing, new axioms (data required for the specific context) are requested (step 823). The core produces the requested data (provide user with the required context) (step 825). The process finishes in step 827.

Figure 9:
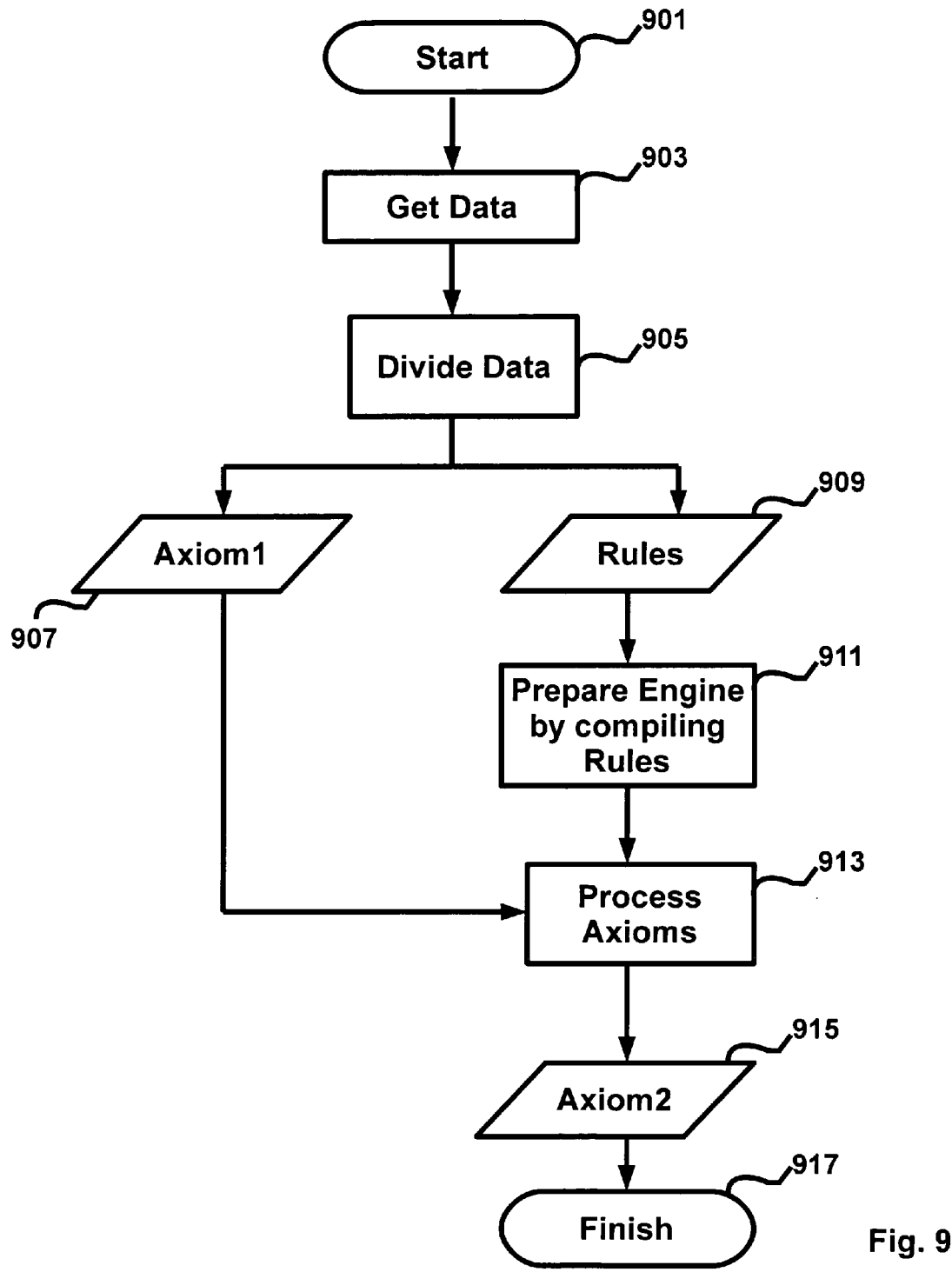
FIG. 9 illustrates more details of the algorithm of working with axioms and rules.

FIG. 9 illustrates Core processing algorithm of working with axioms and rules in the specific example (FIG. 9 illustrates the "Core processes request" block from FIG. 8). After starting (step 901), the data is received in step 903 from source identified by RDF URI. The data is divided, in step 905, into Axioms 907 and Rules 909. In step 911, the Engine is prepared by compiling Rules. In step 913, original axioms (User data) are processed by Engine. In step 915, new Axioms (i.e., contextualized data for the specific data representation) re received. In step 917, the process finishes.

By way of example, there are several types of rules. The filter type rule is frequently used in the tracker cases, for example, receiving a list of support ticket/bugs/tasks of a particular user and a particular project with particular attributes. Therefore, from the overall pool of tasks/bugs/tickets, the information needs to be filtered for the particular user and project, and presented in the form of separate axioms.

Transformative rules relates to the same information that can be presented in a different manner. For example, the IT department views people as users of the IT system. On the other hand, a project manager can view the same people as resources working on particular tasks. As another example, transformative rules can include the following: at the input, data (axioms) is received, that describes a particular ticket (i.e., requests from a particular end user) and t its data representation. Therefore, the engine will receive, at the output, axioms in the form of a specific user interface, filled in with data.

Another example of a type of rule is a generating rule. For example, in a particular project that has more than 50% critical bugs and more than 50% critical tasks, the system will automatically generate the fact about project status (e.g., the status of the project will be listed as "Critical").

Further by way of example, below is how the three rule types given above can be combined using the N3 syntax:

@prefix bug: <http://<company name>.com/tracker/bugs#>.

@prefix task: <http://<company name>.com/project manager/tasks#>.

@prefix prj: <http://<company name>.com/projects#>.

@prefix math: <http://<company name>.com/mathematic#>.

@prefix assert: <http://comindware.com/logics/assert#.

@prefix cmw: <http://comindware.com/logics#.

First, the information is transformed from the bug tracker and from the project management task into the data for the ABC project.

Then, only those bugs that have the status "critical" are filtered to remain and the engine counts total quantity of bugs, and then, if the quantity of "critical" bugs is more than a half of total, then generate critical state of project bugs:

{?bug cmw:is bug:Bug. ?bug prj:included prj:Project_ABC. {?bug prj:Status prjStatus:Critical} assert:count ?numCriticalBugs. {?bug prj :Status ?any}assert:count ?TotalBugs. (?TotalBugs 2) math:divide ?halfTotalBugs. ?numCriticalBugs math:greater ?halfTotalBugs.}=>{prj:Project_ABC prj:BugsCritical true}.

The same operations under data (tasks) from project management systems

{?task :is task:Task. ?task prj:included prj:Project_ABC. {?task prj:Status prjStatus:Critical} assert:count ?numCriticalTasks. {?task prj:Status ?any} assert:count ?TotalTasks.

(?TotalTasks 2) math:divide ?halfTotalTasks. ?numCriticalTasks math:greater ?halfTotalTasks.}=>{prj:Project_ABC prj:TasksCritical true}.

Next, the automatic generation of the "Critical" project status is performed, if the project has tasks and bugs in "Critical" states:

{prj:Project_ABC prj:BugsCritical true. prj:Project_ABC prj:TasksCritical true}. =>{prj:Project_ABC prj:Status "Critical"}.

The same happens with project status but with another condition: automatic generation "Critical" status for project when "critical" bugs OR tasks is more than half.

{?x cmw:is task:Task}=>{?x cmw:is prj:TaskOrBug}.
{?x cmw:is bug:Bug}=>{?x cmw:is prj:TaskOrBug}.
{?x cmw:is prj:TaskOrBug. ?x prj:included prj:Project_ABC. {?x prj:Status prjStatus:Critical} assert:count ?numCritical. {?x prj:Status ?any} assert:count ?Total. (?Total 2) math:divide ?halfTotal. ?numCritical math:greater ?halfTotal.}=>{prj:Project_ABC prj:Status "Critical"}.

As will be appreciated, real-life examples are typically more complex than this, and there can be many more types of rules in most real-life cases, however, the principle is the same.

Example of Conjunction of Axioms

The axiom conjunction example is frequently the most easily understood one. For example, when combining information regarding the requirements of the project (axiom "requirements"—requirements, defined by analysts) and bugs from the bug tracker (axiom "bugs"—bugs, identified by the testers, who are typically quality control engineers, and fills out the bug tracking forms based on certain requirements), "result axiom" results, which, in essence, is a combination of how many bugs are associated with a single functional requirement.

Figure 10:
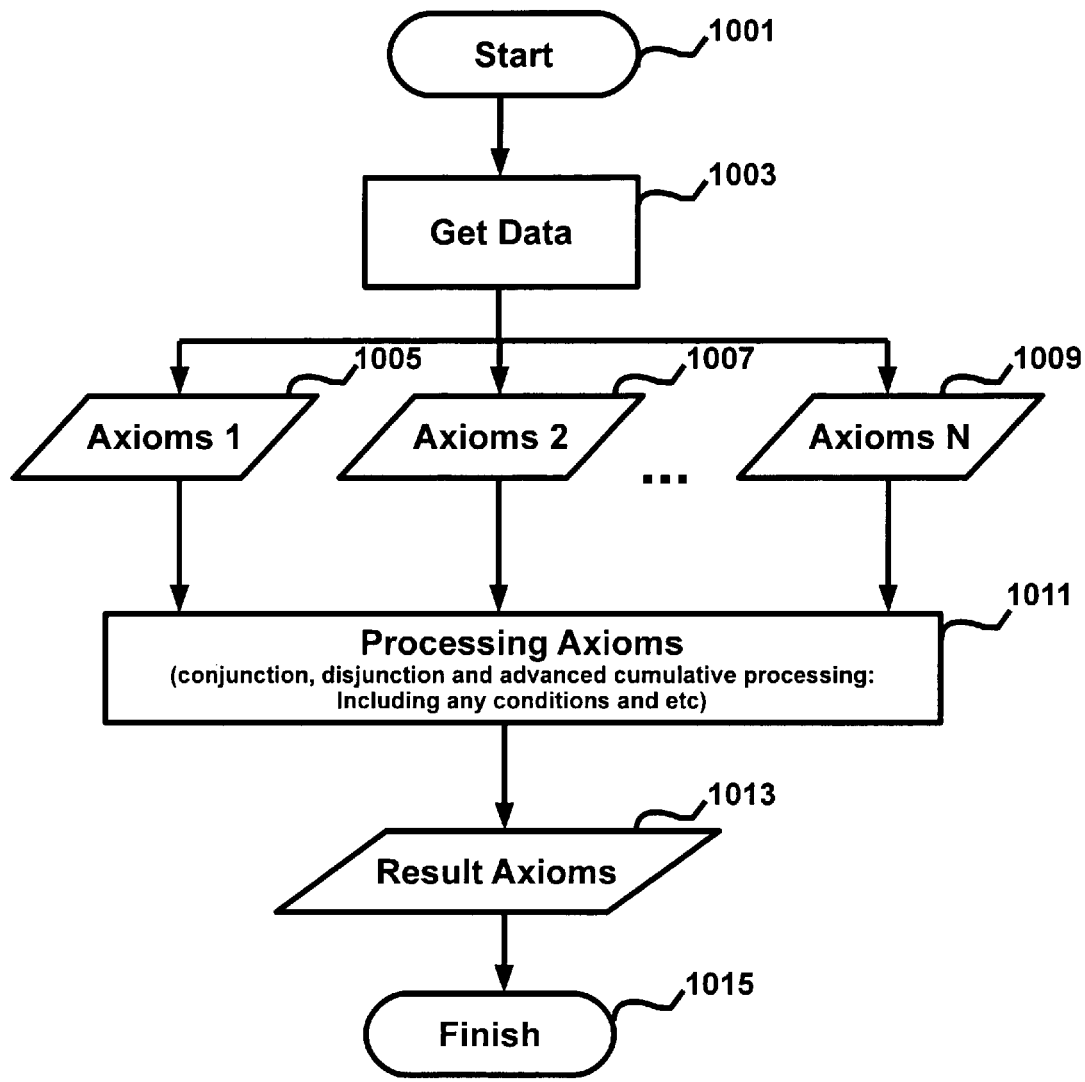
FIG. 10 illustrates various operations under axioms, including conjunction and disjunction.

This is illustrated in FIG. 10. After starting the process (step 1001), data is received from any storage identified by a URI in step 1003. In step 1005, axiom 1 is identified. In step 1007, axiom 2 is identified, etc. In step 1011, the axioms are processed, see result in "Result Axioms" (step 1013). The process finishes in step 1015.

Another illustrative example is the use of semantic web concepts and the notational/syntactic approach described herein to describe the process of manufacturing a toy car. Assume that the production of the toy car uses a tracker to track the state of changes of the assembly. In this case, the axioms relate to any data that is received by the system, in the form of the triplet (subject, predicate, object). These are:

wheels for a Jeep
wheels for a Truck
front wheels for a Sports Car
rear wheels for the Sports Car
body of the Jeep
body of the Truck
body of the Sports Car
Jeep suspension
Truck suspension
Sports Car suspension The rules in this case have a similar appearance, and can look something like as follows:

{?y toys:wheels ?x. ?y toys:suspension ?z}=>{?y toys:chassis (?z ?x)}

This rule, written in N3 syntax, means that if something (X) is a wheel belonging to the car Y, and Z is a suspension of the car Y, then their conjunction will represent the chassis for Y. In this matter, all the other rules will be formulated. As specific examples, the following rules could be created:

Suspension of the Truck should be joined with wheels of the Truck→chassis of the Truck, where the chassis of the Truck is axiomN+1 from FIG. 10, i.e., this is a result of the particular rule.

Chassis of the Truck join with body of the Truck→Truck
Jeep suspension join with Jeep wheels→Jeep chassis
Jeep chassis joined with Jeep body→Jeep
Sports Car suspension joined with wheels of Sports Car→chassis of Sports Car
Chassis of Sports Car joined with body of Sports Car→Sports Car Therefore, all of the axioms and rules are in storage, and when the user, working with the business layer of the system, performs some action (for example, he puts together the wheels and the suspension of the Jeep, and wants to make changes in the tracking system, e.g., toy assembly tracker, that represents the tracing of the assembly—in other words, an alternative representation is in the form of case management), the business layer transmits a request to the core, and the core performs the calculation (see 607-613).

Figure 11:
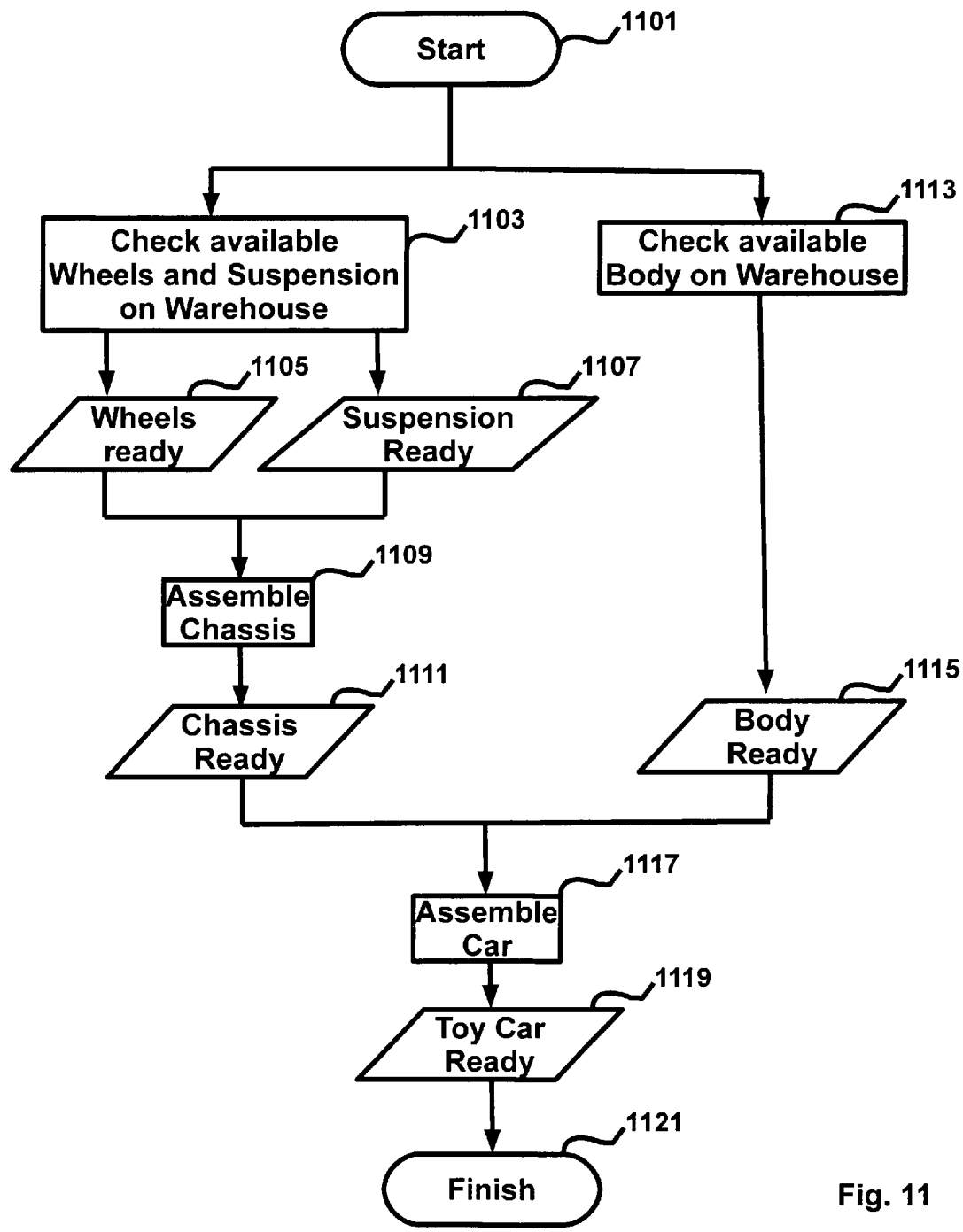
FIG. 11 illustrates an example of application of the principles described herein.

Consider further the concept of a "case" for this example. In this example, case 123 has:

Case Id 123 Assembly
TargetAssembly object: Jeep
Facts: Ready (i.e., fully assembled, otherwise, some fact would not be present)
Body ready
Wheels Ready
Chassis ready
Suspension ready Therefore, for this case, the following actions can be performed:

a) Add part (id)=>Case has a car part for example, add the body, id=some identifier of a part of the car)
b) to assemble wheels and suspension, the following construct can be used:
Assemble parts (id1:id2)
id1 assembled with id2
id assembled id 3=>(case has newpart)
(in other words, this rule corresponds to transitioning to block 1111 in FIG. 11).

Based on the rules, it is possible to receive a list of allowable actions for a particular stage in the assembly, which is why it can be described as "case" and "instruction" (e.g., case when the assembly cannot be completed, because there is no body in the warehouse).

Considering the fundamental actions performed by the system, N3 has been chosen, in this example, as the syntactic notation, which means that all the data is stored in a certain format, defined by this notation. On the other hand, CmwL means that the user's own predicate can be used to describe the system, how it works, etc.

This is illustrated in FIG. 4. For example, the data is stored in the text file example.N3

@prefix cmw:<http://www.comindware.comflogics#>.
@prefix toys:<http://toys.com/description/toys#>.
toys:wheel cmw:belongs toys:track.
{?y toys:wheels ?x. ?y toys:suspension ?z}=>{?y toys:chassis (?z ?x)}

From this, it is clear that the prefix is the place where the specific predicates are formed. In other words, "belongs" is a cmw (an abbreviation that refers to http://www.comindware.com/logics#, and which can contain the necessary logic, i.e., is a CmwL (Cmw Language), while the general syntax is N3. Therefore, in the toy car manufacturing example, there is specific data describing this case. Therefore, the engine (see FIG. 6) can take the data from the storage layer, where, using the N3 notation, the axioms and the rules are stated. The engine can parse the rules, and based on the parse rules, can receive the data to work with the system—i.e., the business application that is used at the moment.

Thus, once the N3 rule has been parsed, it can be used by engine to provide contextualized data to a particular business application for modifications and further work with it. The advantage, compared to OLAP cubes, is that the information can be represented as a "slice" at any time, without a need for recompilation—the information has already been parsed, and there is no need to parse it or compile it again. For example, for the accounting department to calculate the sales receipts from all the assembled toy cars by a particular salesman, it is sufficient to take the information that has already been compiled about the cars that have been put together, and apply to it the rules that filter out information based on the identity of the employee. In other words, there is no recompilation that is needed, but only to change the representation of the information. (See the Formula 1 example below.) For data representation—a switch between contexts of the specific business application—the F1 example is illustrative.

Formula F1 example:
F1 team Ferrari 2004 year
People:
Drivers:
Michael Shumacher
Rubens Barichello
1 Team manager
20 engineers
2 cars/8 wheels/2 suspensions/2 chassis/8 engines for whole season/2 car bodies/15 grant prix in season/1 grand prix is 3 practice races, 1 qualification race and 1 main event–main race/need 15 engineers on race/
Team needs:
1 system for tracking car building (analogous to task tracker for engineers), so in real use case it can be viewed as:
Engineer/Driver logins in system and work with tasks (tasks can look like: assemble chassis assigned on the concrete engineer or test car and drive several laps before Canadian Grand Prix assigned on Michaels Shumacher)
1 system to manage people on races (analogous to a project for a manager) e.g., a manager uses engineers and drivers as resource for a specific race.
Comindware architecture
Have Storage with Data (written in N3 notation: subject-predicate-object):
Axioms:
Shumacher is driver
Peter is engineer
. . .
car requires 4 wheels
car requires 1 engine
. . .
Set up system rules as follows:
driver can use only prepared car (in N3, it can look similar to the toy car example)
The core parses data after receiving Business layer request and compiles the Engine (based on parsed rules). The compiled engine, therefore, knows how to display information for a particular query (in other words, depending on the context, the representation of the information can be different). The core compiles additional rules for Engine only if the specific rule was not parsed before.

When an engineer logins into the system, he sees tasks—what he should do. Following the rules, he assembles the car and updates task statuses. He also changes available car details in the system, because details are resources for the Task The task tracker for mechanics who are servicing the car, to track its readiness for the race, knows that engineers login, and the Engine provides users with information when people is user (task owner for example) and detail is resource. The Engine presents the information in a certain context, here, presenting information to mechanics.

When a manager logins to assign people to the race, he sees people as resource for the specific race. Therefore, for a manager, it will be a different tracker, more akin to a project management software, and the mechanics are resources for the manager's tracker, even though the same mechanics were ordinary users when the car needs to be serviced.

In the proposed architecture, all data can be used in different business applications, using in different business applications, with the specific contextualized views (see FIG. 6) The same system using relational databases or OLAP cubes requires duplicating information in several databases (Peter engineer as engineer for project system for assigning him on the concrete race, and Peter as user for Task tracker during car assembling process). Conventionally, if Ferrari hires a new driver, he needs to be added in project system as resource and in task tracker as user.

A slice is a query for the specific "table of facts", which requires from the user to reconfigure slice every time when the user needs to change any field in table of facts, because they have relational databases (e.g., change driver field as resource for driver as user in table of facts). The proposed architecture configures on-the-fly, because there is no duplicated data.

Figure 12:
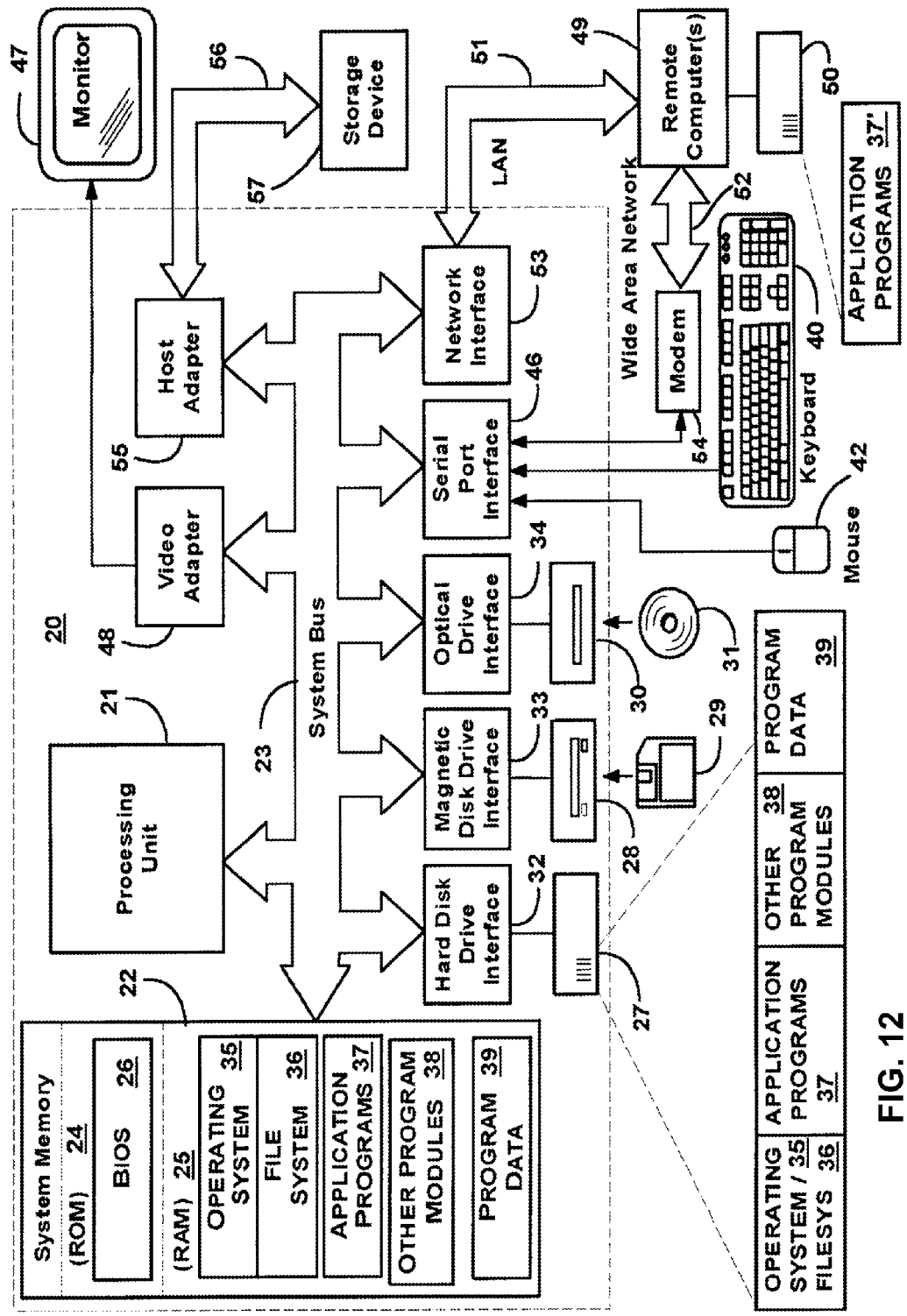
FIG. 12 illustrates a schematic of an exemplary computer system that can be used for implementation of the invention.

With reference to FIG. 12, an exemplary system for implementing the invention includes a general purpose computing (or processing) device 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory optionally includes read-only memory (ROM) 24 and random access memory (RAM) 25. A basic input/output system 26 (BIOS), containing the basic routines that help transfer information between elements within the device 20, such as during start-up, is stored in ROM 24.

The computing device 20 can optionally include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein does not employ a hard disk, a removable magnetic disk 29 and a removable optical disk 31, it should be appreciated by those skilled in the art that these devices can also be used in the exemplary operating environment.

A number of program modules may be stored on the hard disk, magnetic disk 29, optical disk 31, ROM 24 or RAM 25, including an operating system 35. The computing device 20 includes a file system 36 associated with or included within the operating system 35, one or more application programs 37, other program modules 38 and program data 39. A user may enter commands and information into the computing device 20 through input devices such as a keyboard 40 and pointing device 42, but these devices are optional. The exemplary embodiment provides a virtual keyboard and a "touch screen" option for pointing.

These and other input devices are often connected to the processing unit 21 through a serial port interface 46 that is coupled to the system bus, but may be connected by other interfaces, such as a parallel port, game port or universal serial bus (USB). A monitor 47 or other type of display device can be optionally connected to the system bus 23 via an interface, such as a video adapter 48. In the exemplary embodiment, an integrated display is used.

The computing device 20 may operate in a networked environment using logical connections to one or more remote computers 49. The remote computer (or computers) 49 may be another computer, a server, a router, a network PC, a peer device or other common network node, and typically includes many or all of the elements described above relative to the device 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the device 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for processing business data, the system comprising:
   a plurality of databases located on one or more hardware storage devices and storing rules and user data both represented in SPO (subject-predicate-object) triplet format, the user data including axioms representing facts, wherein a particular business application stores its user data in multiple databases;
   a common storage layer that connects to all of the multiple databases and maintains a record of what is stored in which database;
   wherein the common storage layer permits working with the multiple databases simultaneously and permits a user to use axioms and rules from the multiple databases simultaneously;
   at least one ontology based on the rules and axioms that represent a particular data interpretation;
   a logical core that converts the user data into the SPO format, based on context provided by a business application that works with specific objects and ontologies, the context being defined by a particular ontology and representing an environment surrounding a particular event, object or individual that defines an interpretation of the axioms, including a method of processing the axioms;
   the logical core performing operations on the axioms based on event-defined triggers specified by the rules and generating new axioms in the same context,
   the logical core also adding new ontologies that include new rules;
   the logical core processing requests from a business layer to transform one set of SPO triplets into different set of SPO triplets; and
   a presentation layer that filters the user data based on connections between objects established by the ontologies and the SPO triplets and presents the axioms to the user based on the context.

2. The system of claim 1, wherein the presentation layer filters the data based on enforcing a context on the inputted data.

3. The system of claim 1, wherein the presentation layer filters the data based on enforcing a context on the outputted data.

4. The system of claim 1, wherein the presentation layer interprets the data in its context.

5. A computer-implemented method of processing business data, the method comprising:
   specifying a plurality of ontologies that are based on axioms and rules for processing the axioms, the ontologies written in subject-predicate-object (SPO) triplet format;
   generating a request to a presentation engine for presenting data to a user;
   specifying a representation of the SPO triplets in a particular context;
   wherein the context is specified by a particular ontology and representing an environment surrounding a particular event, object or individual that defines an interpretation of the user data, and any actions or operations on the user data in a particular situation, including a method of processing the user data;
   using a user-selected ontology, preparing a requested data representation,
   wherein rules needed to respond to the request from the user, based on one of the elements of the SPO triplet being responsive to the request, are compiled and processed by the engine, without re-compiling previously compiled rules,
   wherein a particular business application stores its data in multiple databases, and
   wherein the data in the SPO triplet format is processed and presented to the user in the particular context, including filtering the user data based on connections between objects established by the ontologies and the SPO triplets and adding new ontologies that include new rules, such that the processing includes performing operations on the axioms based on event-defined triggers specified by the rules and generating new axioms in the particular context, and transforming one set of SPO triplets into different set of SPO triplets.

6. The method of claim 5, further comprising generating new axioms by representing existing axioms in a new context.

7. The method of claim 5, further comprising adding new ontologies that include existing axioms.

8. The method of claim 5, further comprising adding new ontologies that include new axioms.

9. The method of claim 5, further comprising adding new ontologies that include existing rules.

10. The method of claim 5, further comprising specifying the context for the data that defines which operations can be performed on the data.

11. The method of claim 10, further comprising defining trigger conditions that specify when the operations should be performed.

12. The method of claim 5, further comprising generation of a data representation for the same data but in a new context.

13. The method of claim 5, further comprising processing of requests from a business layer to transform the data.

14. The method of claim 5, wherein the data presentation comprises filtering the data based on connections between the data objects established by the ontologies and the subject-predicate-object triplets.

15. The method of claim 5, wherein the data presentation comprises filtering the data based on enforcing a context on the inputted data.

16. The method of claim 5, wherein the data presentation comprises filtering the data based on enforcing a context on the outputted data.

17. The method of claim 5, wherein the ontology includes restrictions on the axioms used to validate the data.

18. A computer-implemented method of processing and presenting business data, the method comprising:
- storing rules and axioms in SPO (subject-predicate-object) format in multiple databases, wherein a particular business application stores its data in the multiple databases, the axioms representing facts;
- using a storage layer to connect to the multiple databases and maintaining a record of which data is stored in which database, the data comprising rules and axioms, the axioms representing user data;
- at least one ontology based on the rules and axioms, wherein the ontology corresponds to a particular data interpretation;
- wherein the storage layer permits working with the multiple databases simultaneously and permits a user to use the SPO triplets from the multiple databases simultaneously;
- transforming the axioms and their corresponding SPO triplets into a different set of SPO triplets, based on context provided by a business application that works with specific objects and ontologies, the context being defined by a particular ontology and representing an environment surrounding a particular event, object or individual that defines an interpretation of the user data, and any actions or operations on the user data in a particular situation, including a method of processing the user data;
- performing operations on the axioms based on event-driven triggers specified by the rules;
- adding new ontologies that include new rules and generating new axioms in the same context;
- processing requests from a business layer to transform the SPO triplets into the different set of SPO triplets; and
- presenting the different set of SPO triplets to the user based on the context, including filtering the user data based on connections between objects established by the ontologies and the SPO triplets.

19. The method of claim 18, wherein the data presentation comprises filtering the data based on enforcing a context on the inputted data.

20. The method of claim 18, wherein the data presentation comprises filtering the data based on enforcing a context on the outputted data.

21. The method of claim 18, wherein the operations include logical operations.

22. The method of claim 18, wherein the operations include mathematical operations.

23. The method of claim 18, wherein the operations include string operations.

24. The method of claim 18, wherein the operations include spreadsheet operations.

25. The method of claim 18, wherein the operations are specified by the user and include a combination of spreadsheet, logical and mathematical operations.

26. The method of claim 18, wherein the operations include conjunction of the axioms.

27. The method of claim 18, wherein the operations include disjunction of the axioms.

28. The method of claim 18, further comprising generating new data in a new context based on existing data in an existing context and a new business application.

\* \* \* \* \*